Patented June 16, 1931

1,810,266

UNITED STATES PATENT OFFICE

EMILE COMES, OF LES-PONTS-DE-MARTEL, SWITZERLAND

COMPOSITION FOR DYEING LEATHER, SHOES, GLOVES AND HIDES

No Drawing. Application filed September 28, 1928, Serial No. 309,128, and in Switzerland October 11, 1927.

This invention relates to a composition for dyeing leather and the like and to a process of manufacturing the same.

The composition consists of a fatty body, a dye, acetone and a solvent for the fatty matter. For the production the fatty body is melted and admixed with the dye soluble in the fatty body and with turpentine oil by heating. The mixture is allowed to cool, whereupon medium heavy benzine is added, the mixture allowed to stand for a certain time, and acetone is subsequently added.

*Example.*—Stearin 50 grms., turpentine oil 50 grms., and azodye 100 grms. are together heated in a water bath to approximately 60° C. and well stirred with a wooden spattle. When the mixture is perfectly dissolved and has become quite uniform, the temperature is decreased to 45° C. and medium heavy benzine of a density of approximately 0,720 is added under stirring in little quantities up to the total quantity of 1300 grms. After thorough mixing the mixture is left to stand for about 24 hours, the vessel being airtightly closed. After this time the vessel is opened and 1300 grms. of acetone are further added.

The addition of acetone serves to maintain in solution all the substances in the mixture. Acetone possesses the properties to open the pores of the leather, to well bind the dye with the fatty substances, and to fix the same in the leather. As it evaporates rapidly it allows direct dyeing.

The dyeing composition described penetrates deeply into the leather and withstands the actions of the light, of the alkalis and of mechanical stresses; it further does not peel off.

I claim:—

1. A composition for dyeing leather, shoes, gloves and hides, consisting of a fatty body, an oil soluble dye, turpentine oil and acetone.

2. A process of producing the dyeing composition specified in claim 1, consisting in admixing the fat body, with the oil soluble dye and turpentine oil, in heating, in allowing the mixture to cool, in adding medium heavy benzine during the cooling, in letting the mixture stand, and in adding acetone to the settled mixture.

In testimony whereof I affix my signature.

EMILE COMES.